W. J. HOLLAND.
DRILL BIT.
APPLICATION FILED MAY 13, 1919.

1,345,854.

Patented July 6, 1920.

INVENTOR
Walter J. Holland
BY
Strong & Townsend
ATTORNEYS

UNITED STATES PATENT OFFICE.

WALTER J. HOLLAND, OF FAIROAKS, CALIFORNIA, ASSIGNOR OF ONE-FOURTH TO PERCY M. PIKE AND ALVIN R. JOHNSON, OF SAN FRANCISCO, CALIFORNIA.

DRILL-BIT.

1,345,854.  Specification of Letters Patent.  Patented July 6, 1920.

Application filed May 13, 1919. Serial No. 296,809.

*To all whom it may concern:*

Be it known that I, WALTER J. HOLLAND, a citizen of the United States, residing at Fairoaks, in the county of Sacramento and State of California, have invented new and useful Improvements in Drill-Bits, of which the following is a specification.

This invention particularly pertains to a well-drilling bit.

It is the principal object of the present invention to provide a single-blade bit for drilling wells, which is so designed as to be detachably equipped with a cutting edge which may be readily removed or interchanged when desired, and which will permit the body of the tool to be made of low-grade steel and the cutting edge to be made of high-grade steel, such as chrome steel or other steel of like character.

The present invention contemplates the use of a flat body member adapted to be detachably secured to the lower end of a drill rod which is equipped with a detachable cutting member, extending around three sides of the body portion, and to be held rigidly in relation thereto, so that various strains incident to the drilling operation may be resisted and the cutting edges may be interchanged when required.

The invention is illustrated, by way of example, in the accompanying drawings in which:—

Figure 1:
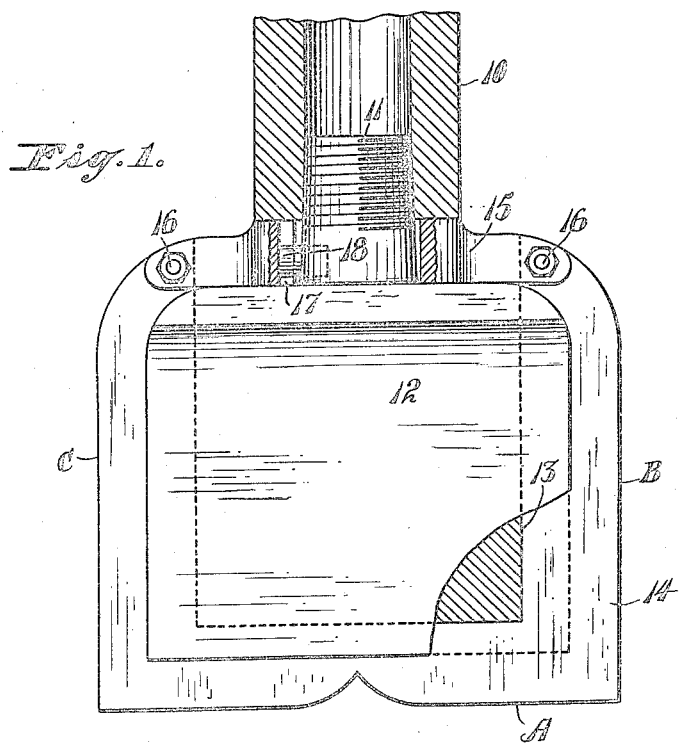
Figure 1 is a view in side elevation, showing the complete tool, with parts broken away to more clearly disclose the manner in which the tool is rigidly held and the manner in which it is fastened to a drill rod.
Figure 2:
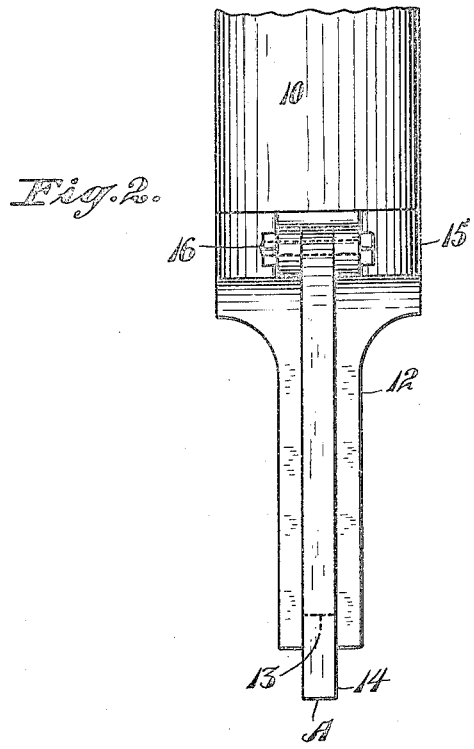
Fig. 2 is a view in end elevation, showing the tool and the relative thicknesses of the main body portion of the cutting edge.

Referring more particularly to the drawings, 10 indicates a drill rod or pipe here shown as interiorly threaded at its lower end, and receiving a spindle 11. The spindle or shank 11 is formed integral with the body plate 12. This body plate is substantially rectangular in shape, and is flattened from a point directly beneath the spindle 11, as shown in Fig. 2, to form a flat plate which is adapted to produce the drilling operation. In the present instance, however, this plate is not equipped with a permanent cutting edge, but is formed with a groove 13, which extends along three sides of the body portion. This groove is rectangular in shape, and receives a U-shaped cutting blade 14. The cutting blade 14 has a bottom edge A and side edges B and C, thus providing removable and renewable cutting edges for the lower end of the hole and sides. The upper ends of the cutting edges are rounded off and are intended to fit between the ears of a clamping collar 15. This clamping collar is formed with an opening through which a bolt 16 extends and by which the cutting edge is attached and secured in place. The collar is formed with a central circular boss through which the shank 11 extends and which is formed with a key 17. A pin 18 extends into this key and insures that the body structure and the renewable cutting edge will rotate together at all times.

In operation of the present invention the body member 12 is taken and its shank 11 is inserted through the boss portion of the member 15. The detachable cutting member 14 is then positioned around the three sides of the plate 12, and is secured in this position by means of the bolt 16. The entire structure is then secured to the lower end of the drill rod 10 by screwing the spindle 11 into the threaded opening of the drill rod. When the rod has been drawn tightly against the upper face of the member 15 the drill may be then used until the cutting edge has been damaged or mutilated to such an extent that its removal and renewal are desired. This may be done by a reversal of the previously described operation.

The drilling action is produced by revolving the drill rod and the grooved plate or extension (by any well-known means not here shown) and this drives the cutting blade 14, which is fitted into the channels in the edges of the carrier plate 12. The revolution of these associated parts causes the edges of the blade 14 to abrade or disintegrate the material upon which it is acting.

It will thus be seen that the present device, although decidedly simple in its construction, will provide a drill bit, which has a very tough and highly desirable cutting edge, without requiring that the entire bit be made of high-grade steel, and also insuring that the cutting edge may be renewed or repaired when desired without materially retarding the progress of the drilling operation.

While I have shown the preferred form of my invention as now known to me, it will be understood that various changes in the combination, construction and arrangement of parts may be made by those skilled in the art without departing from the spirit of the invention as claimed.

Having thus described my invention, what I claim and desire to secure by Letters Patent is:

1. A drilling device comprising a flat body member having a shank on one side adapted to enter and be secured to a drill stem, a cutting member positioned around the remaining three edges of the body, a collar inclosing the shank and having lugs in which the separated ends of the bit are detachably held in relation thereto.

2. A drilling device comprising a flat body member, a threaded shank extending from one edge and adapted to engage with a drill stem, a groove extending around the three remaining edges of the body; a cutting member adapted to be seated within the groove, a collar inclosing the threaded shank and having lugs projecting therefrom, with which lugs, the separated ends of the cutting member engage, a keyway formed in the collar and a pin in the shank, engaging with the key way when assembled.

3. A drill bit comprising a flat body portion, a threaded spindle extending from one edge of said body, a groove continuing around the opposite three edges of the body, a collar member mounted around the stem in a detachable manner, and a U-shaped cutting blade adapted to be secured by its opposite ends to the collar member, and to seat within the groove extending around the body portion.

In testimony whereof I have hereunto set my hand in the presence of two subscribing witnesses.

WALTER J. HOLLAND

Witnesses:
E. M. HOLLAND,
RUTH W. HOLLAND.